United States Patent [19]

Wierschke

[11] 4,394,341
[45] Jul. 19, 1983

[54] METHOD TO CENTER AND SEPARATE ELECTROFORMED REPLICAS FROM A MATRIX

[75] Inventor: Donald J. Wierschke, Brownsburg, Ind.

[73] Assignee: RCA Corporation, New York, N.Y.

[21] Appl. No.: 344,533

[22] Filed: Feb. 1, 1982

[51] Int. Cl.³ .............................................. B29C 1/02
[52] U.S. Cl. .................................... 264/225; 264/220; 264/227; 264/264; 249/66 R; 204/5; 204/281; 425/436 RM; 425/810
[58] Field of Search ............... 264/106, 225, 226, 227, 264/220, 219, 264, 334, 227, 219, 234, 16; 204/4, 5, 281; 249/66 R; 425/436 R, 810, 436 RM

[56] References Cited

U.S. PATENT DOCUMENTS

| | | | |
|---|---|---|---|
| 2,890,160 | 6/1959 | Hunting | 204/281 |
| 2,905,614 | 9/1959 | Porrata | 204/5 |
| 3,019,482 | 2/1962 | Houten | 204/4 |
| 3,316,607 | 5/1967 | Kroll | 249/66 R |
| 3,801,476 | 4/1974 | Röschmann | 204/5 |
| 3,956,075 | 5/1976 | Rohwer | 204/5 |
| 3,975,489 | 8/1976 | Mercer | 264/234 |
| 4,242,292 | 12/1980 | Mercer | 264/16 |

Primary Examiner—Donald E. Czaja
Assistant Examiner—Joel S. Baden
Attorney, Agent, or Firm—Birgit E. Morris; Edward J. Sites

[57] ABSTRACT

An improvement is disclosed in the matrixing process employed in the manufacture of molded records. The improvement consists of using an insert in the matrixing process which is secured to the center portion of the matrix to be duplicated prior to electroforming a replica on the surface of the matrix. Metal is then electroformed over the surface of the matrix and the insert to form the replica and the insert is thereafter used to apply force at the center portion of the replica to force it away from the matrix on which it is formed.

6 Claims, 6 Drawing Figures

METHOD TO CENTER AND SEPARATE ELECTROFORMED REPLICAS FROM A MATRIX

This invention relates to a matrixing method for use in the manufacture of molded records and, more particularly, is concerned with an improved method for centering of matrixes for electroforming and an improved method for thereafter separating the electroformed replicas from the matrixes.

BACKGROUND OF THE INVENTION

In the manufacture of molded records, such as conventional audio records and the more recently developed video discs, a plastic material is molded between a pair of metal parts known as stampers. Stampers are thin metal discs which have formed in the molding surface thereof a surface relief pattern which includes an information track containing signal elements corresponding to the program desired to be reproduced on playback of the molded record.

The stampers are the final product of a multi-step replication process which is referred to in the art as matrixing. The initial step in the matrixing process is to cut the required surface relief image into a flat, disc-shaped member known as a recording substrate. The information track portion of the surface relief pattern is cut into the recording substrate in the form of a spiral which is essentially concentric with the center of the recording substrate. It is important that the information track be as concentric as possible with the center of the recording substrate, and that all subsequent replicas produced in the matrixing process have the information track positioned concentrically in order to eliminate run-out and other related problems in the molded records.

After the surface relief pattern is cut into the recording substrate, the recording substrate is replicated by electrodepositing a metal, such as nickel, on the surface of the recording substrate. When a predetermined thickness of metal, typically about 9 mils (2.4 mm), has been deposited on the substrate, the resulting electroformed part, called a master, is then carefully separated from the surface of the recording substrate.

The resulting master is then in turn used as a matrix, i.e., a part on which a replica is to be formed. A metal, again typically nickel, is electrodeposited on the surface of the master until a predetermined thickness of metal, typically about 9 mils of an inch (2.4 mm), is deposited on the matrix. The resulting replica formed on the matrix, which is referred to as a mold, is then carefully separated from the surface of the master.

The mold in turn is then used as a matrix on which to form additional replicas. A metal, such as nickel, is electrodeposited on the mold until typically about 7 mils of an inch (1.8 mm) thickness of metal has been electrodeposited on the mold. The resulting electroformed replica which is the stamper must then be carefully separated from the mold and is thereafter used to mold records as noted above.

For purposes of simplifying the further explanation of the present invention, the term "matrix" will be used hereinafter unless otherwise indicated to refer to a part which is to be replicated, and the term "replica" will be used hereinafter unless otherwise indicated to refer to a part which is to be formed on the matrix. It should be noted that the replicas formed in one step of the matrixing process are thereafter used as the matrixes in the subsequent step in the matrixing process.

One of the major problems encountered in the matrixing process is the separation of the electroformed replicas from the matrixes on which they are formed. In the conventional separation methods employed in the art, the outer edge of the sandwich comprised of the matrix and the replica electroformed on the matrix is split at the edges of the replica by using a sharp blade or the like. This initial step breaks the surface bond at the outer edge between the matrix and the replica. Thereafter, a portion of the outer edge of the replica is bent upward and gripped with pliers or the like, and the replica is stripped from the surface of the matrix. The separation step under the best of conditions is somewhat erratic and uncontrollable, as sometimes the replica and matrix will easily snap apart from each other and at other times they are extremely difficult to separate. The separation process often results in the replica or the matrix being bent or otherwise irreparably damaged.

Some attempts have been made to apply a separation force at the center hole portion of the sandwich comprised of the replica and the matrix in order to separate the replica from the matrix. Attempts have been made, for example, to cut and split the replica from the matrix at the center hole with a tool similar to that used in the technique employed at the outer edges. Attempts have also been made to inject gases or fluids at the center hole portion between the matrix and the replica to force the replica from the matrix. The above-noted attempts and other similar attempts have not, however, proven to be completely satisfactory in that it is still difficult at best to induce separation at the center hole when using conventional electroforming methods to form the replicas on the matrix. The center hole which is obtained using conventional electroforming methods is inherently relatively small, rough, and irregular in configuration so that it is difficult to get a reliable grip at the center hole portion of the replica.

A further problem that is encountered in the matrixing process is centering of the electroformed matrixes on the cathode heads used in the electroforming process. The typical ragged-edged, irregularly-shaped center holes in the electroformed parts obtained using conventional matrixing processes makes it difficult, if not impossible, to accurately center the electroformed parts thereafter used as matrixes on the cathode heads. The inability to accurately center the matrixes in the matrixing process causes considerable complications in the final processing of the stampers and also can lead to related problems, such as excessive run-out and the like in the molded records.

What would be highly advantageous would be a method for improving the separation of electroformed replicas from matrixes and also for improving the centering of matrixes in the electroforming process.

SUMMARY OF THE INVENTION

A method is provided for improving the separation of electroformed replicas from the matrixes on which they are formed and for improving the centering of the matrixes thereafter used in the matrixing process. In the method of this invention, an insert having a positive lead and a means for securing a separation tool to the insert is secured at the center of the matrix to be replicated prior to electroforming the replica on the matrix. The replica which is then electroformed over the matrix will cover both the matrix and the lead portion of the insert. Thereafter, a separation tool is secured to the insert and force can be applied at the center portion of the replica to assist in the separation of the replica from the matrix. The raised metal portion which is formed over the insert thereafter provides a guide means for assisting in centering of the matrix on the cathode head in subsequent matrixing steps.

DETAILED DESCRIPTION OF THE INVENTION

Figure 1:
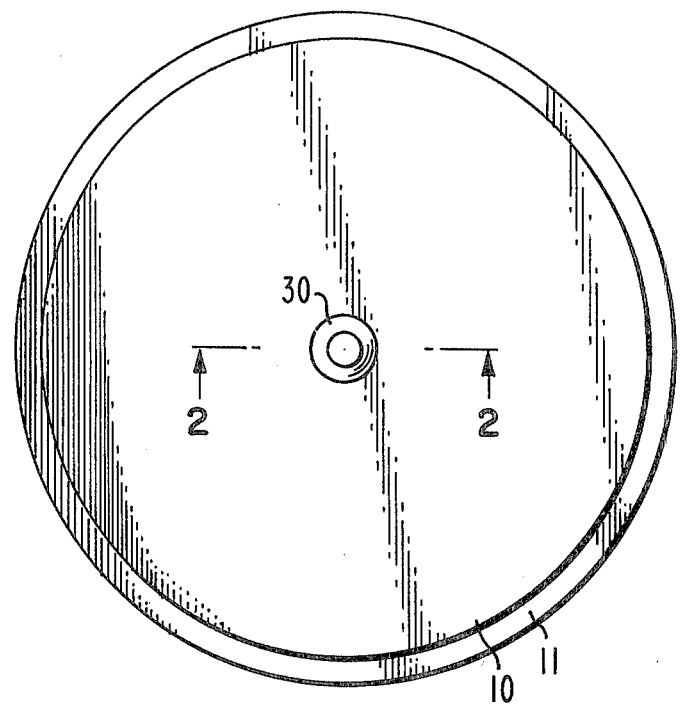
FIG. 1 is an illustration of a replica formed on the matrix in accordance with the method of the present invention.
Figure 2:
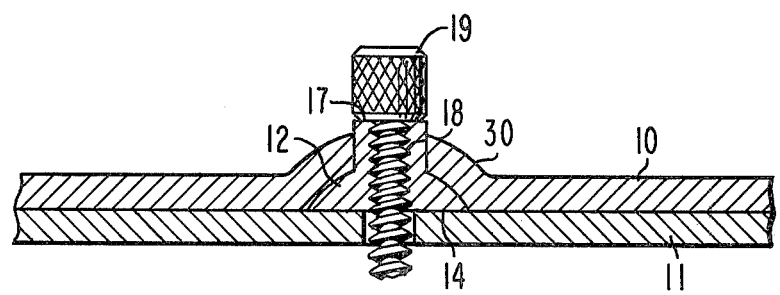
FIG. 2 is a cross-sectional view taken as indicated by the arrow 2 on FIG. 1.

In the method of this invention when it is desired to electroform a replica 10 on the surface of a matrix 11, an insert 12 is initially positioned and secured at the center of the matrix 11. The metal which is used to form the replica is then electrodeposited over the combination of the matrix 11 and the insert 12.

The material of which the insert 12 is comprised, as well as the configuration of the insert, are both important considerations in the selection of an insert 12 for use in this invention. The surface insert 12 must be passive in the electroforming process, i.e., the electrodeposited metal must not alloy or adhere to the exposed surface of the insert on which the electrodeposited metal is electroformed. In order to obtain a suitable insert 12 when an active metal such as nickel or copper is used as the insert, the surface of the metal is passivated in the conventional manner. A more preferable method, however, is to make the insert from a material which is inherently passive in the electroforming process. One such material which has been found to be especially useful is high-chromium stainless steel.

The insert 12 is shaped so as to have a pronounced positive lead 13 by having the insert 12 substantially wider at its base portion 14 than at its upper portion 15. The positive lead 13 is required in order for the insert 12 to be easily removed from the electroformed replica 10 after the replica is separated from the matrix 11. The positive lead 13, as illustrated in FIG. 3, is provided by use of a spherical section 16 which extends from the base 14 to the base of the right cylindrical boss 17.

The insert 12, as illustrated, has a threaded center hole 18 which extends through the insert 12. The threaded center hole 18 is used to provide a means for making a mechanical connection to the insert 12 as will be explained in greater detail below.

Figure 3:
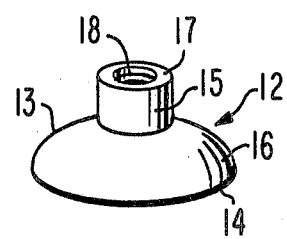
FIG. 3 is an illustration of an insert suitable for use in the method of this invention.
Figure 4:
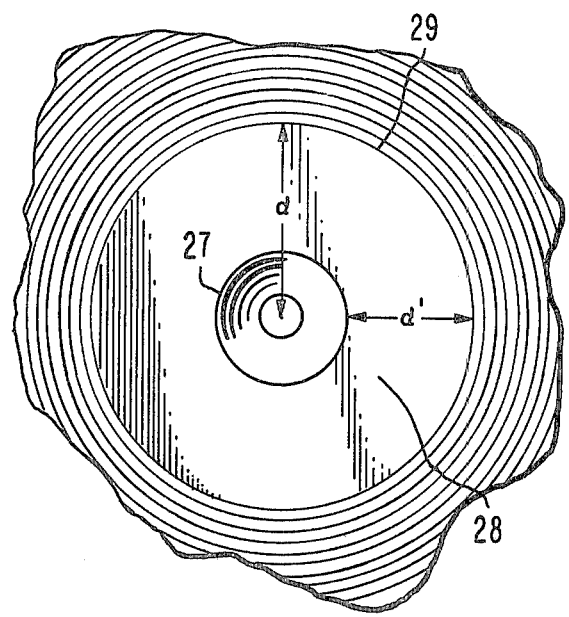
FIG. 4 is an illustration of the center portion of the underside of the replica shown in FIG. 1.
Figure 6:
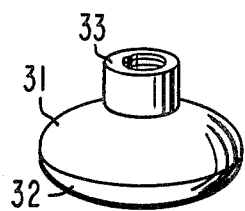
FIG. 6 is an alternate type of insert for use in the matrixing process of this invention.

The insert 12 shown in FIG. 3 is the preferred configuration for use in this invention. However, it should be appreciated that inserts having other types of configuration, such as having other types of positive leads and other means for making mechanical connections to the insert, can likewise advantageously be used in this invention. One such obvious alternative configuration is to use a truncated conical section in place of the spherical section 16. Alternate connection means which can advantageously be used are locking lugs or pin connectors. Furthermore, while a female thread 18 is shown on the inside of the boss 17, it is also possible, though not preferable, to use a male thread on the outer diameter of the boss 17 to provide a means for making a mechanical connection to the insert 12.

The actual size of the insert 12 is not critical. The insert 12 should, however, have a sufficient diameter at its base 14 and a sufficient lead 13 extending from the edge of the base 14 to the outer edge of the boss 17 that an effective amount of force can be applied to the replica 10 formed on the matrix 11 so as to cause the separation of the replica from the surface of the matrix, as will be explained in greater detail below. The outer diameter of the insert 12 is limited only to the extent that it should not be excessively large so as to interfere with the formation of the center hole which will be provided in the stamper and not to cover the information track. In practice it has been found that an insert having an outer diameter of from about $\frac{3}{4}$ of an inch (1.95 cm) to about 1 inch (2.54 cm) with a lead 13 extending to a boss 17 of about $\frac{3}{8}$ of an inch (9.58 cm) in diameter provides satisfactory results for use in this invention.

In accordance with the method of this invention, the matrix 11 which is to be replicated is mounted and centered on the axis of rotation of the cathode head of an electroforming apparatus (not shown). In the preferred embodiment of this invention, the electroforming replication process is commenced by using the recording substrate as the first matrix to be replicated using the insert 12 in accordance with the teachings of this invention. Starting with the recording substrate is preferred in that the recording substrate have a precisely drilled hole in the center thereof and the recorded information track will inherently be essentially concentric with the center hole because of the nature of the recording process utilized in cutting of the recording substrate.

If, however, a matrix which has been electroformed in the conventional manner, which has an irregular center hole, is used in the matrixing process, the matrix should be centered from the cathode head by carefully measuring the distance from the information track to the center of the matrix to assure that the recording track is concentrically positioned relative to the center of the cathode head.

Once the matrix is centered on the cathode head, the insert 12 is positioned on the surface at the center of the matrix 11 so that the base 14 of the insert 12 is flush with the surface of the matrix 11. A cathode knob 19 is then attached to a stud extending from the cathode head of the electroforming apparatus, and the cathode knob 19 is tightened so as to force the insert into sealing contact with the matrix 11.

The metal from which the replica 10 is to be formed is then electrodeposited on the matrix in the conventional manner with regard to the chemical composition of the plating bath and electroforming conditions employed for the electrodeposition. The metal which is electrodeposited on the matrix will conform to the surface of the matrix 11 and to the surface of the positive lead 13 of the insert and will extend up to the outer edge 15 of the boss 17. The cathode knob 19 prevents the deposition of metal in the threaded center hole 18.

When the desired amount of metal has been electrodeposited on the matrix 11 so as to form a replica 10, the electroforming process is discontinued, the cathode knob 19 is removed, and the sandwich assembly consisting of the replica 10, the matrix 11, and the insert 12 is removed from the cathode head of the electroforming apparatus.

The sandwich assembly is then separated into its component parts. A suitable tool is secured to the threaded center hole 18 of the insert 12, and a separating force is applied in a direction which will pull the replica 10 away from the surface of the matrix 11.

Figure 5:
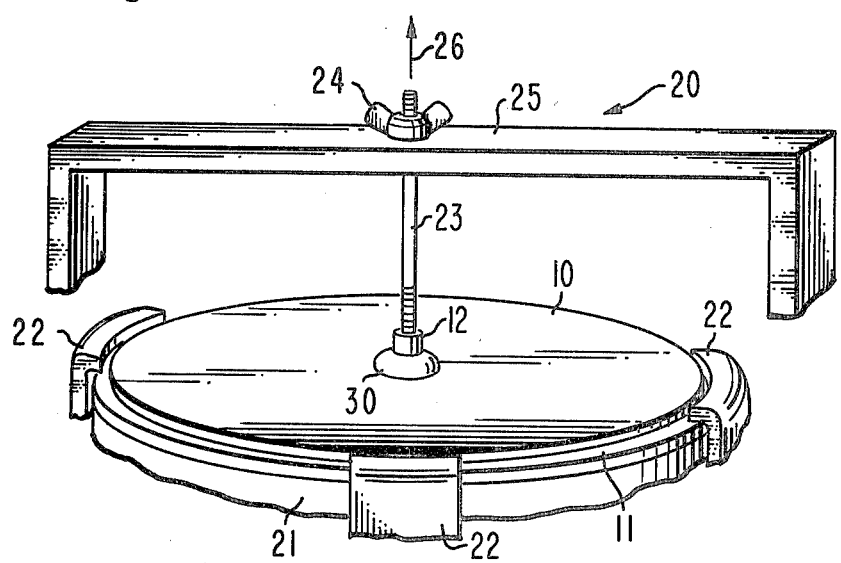
FIG. 5 is an illustration of an apparatus suitable for use in separating replicas and matrixes in accordance with the teachings of this invention.

Various types of apparatus and methods can be used for the separation step. A highly suitable type of apparatus 20 is schematically illustrated in FIG. 5. Using the apparatus illustrated in FIG. 5, the sandwich assembly of the matrix 11, the replica 10, and the insert 12 is mounted on the support table 21. A set of clamps 22 is then positioned so as to grip the outer portion of the matrix beyond the point where the replica 10 is formed on the surface of the matrix 11. A threaded rod 23 is then attached to the center hole 18 of the insert 12 at one of its ends and into a device for applying an upward pressure, which as illustrated is a wing nut 24 which is engaged against a fixed support member 25. To separate the replica 10 from the matrix 11, the joint about the outer diameter of the replica 10 and the matrix 11 is slightly loosened with a knife or the like, somewhat as in the prior art. The clamps 22 are then engaged to hold the matrix 11 against the support table. The means for applying the pressure, i.e., the wing nut 24, is then turned so as to advance the rod 23 in an upward direction as indicated by the arrow 26. In this manner the insert 12 applies an upward separating force at the center portion of the replica which assists in the separation of the replica 10 from the surface of the matrix 11. After the separation is achieved, the insert 12 and the rod 23 hold the replica 10 in a spaced-apart relationship from the matrix 11 so as to prevent surface damage to both parts.

After the replica 10 has been separated from the matrix 11, the threaded rod 23 is removed from the insert 12, and the insert being passive to the electrodeposited metal and having a positive lead 13 can then be readily removed from the replica 10.

The use of the insert 12 as noted above simplifies the separation step and also substantially reduces the possibility of damage to the parts during the separation step.

A further significant advantage obtained using the insert 12 in the matrixing process of this invention is that the replica thus formed can more easily and more accurately be centered on the cathode heads in subsequent replicating steps. When the metal is electroformed over the matrix 11, the replica 10 will be formed with a raised domed-shaped area 30 over the insert 12 which will have a precise edge 27 on the inner side of the replica which edge 27 will be concentric with the edge 29 of the information track. If the original matrix was properly centered on the cathode head, the outer raised portion 30 can likewise be used as a positioning and centering guide by providing cathode heads with appropriately-shaped mating depressions at the center thereof to receive the raised dome 30. When this technique is employed, a modified insert 31 is preferably used to secure the matrix 11 to the cathode head. The modified insert 31 has a spherical portion 32, as well as a right cylindrical boss portion 33. The modified insert 31 is preferably employed to generate replicas in that the insert 31 will conform to the shape of the matrix to be replicated and also provide a centering grip for use in the separation of the replica 10 from the matrixes 11.

The present invention provides a relatively inexpensive, simple, and effective method for improving the separation of replicas from the matrixes on which they are formed and also provides a unique method of centering the replicas when they are used as matrixes in subsequent electroforming processes.

What is claimed is:

1. In the matrixng method employed in the manufacture of a molded record wherein a matrix, having a relief pattern defined in a surface thereof, which pattern includes a spiral information track positioned concentrically about an unrecorded center portion, is replicated by electroforming a metal on the surface of the matrix until a predetermined thickness of metal has been deposited and the replica thus formed is separated from the surface of the matrix, the improvement which comprises:
(a) providing an insert member having a surface which is passive to the metal to be electroformed on the matrix, said insert being an integral member having a given shape consisting of a base of a first diameter which is less than the diameter of the unrecorded portion of the matrix, a boss portion positioned normally and centrally with respect to the diameter of the base and being of a second diameter less than said first diameter, and a positive lead portion extending from the first diameter to the second diameter, said insert further including attaching means associated with said boss portion for securing a separation tool to said insert;
(b) positioning and securing said insert to the matrix with a securing means prior to electroforming metal on the matrix, said insert being placed with its base portion flush against the matrix at a position in the center unrecorded portion concentrically equidistant from the information track;
(c) electroforming the metal over the surface of the matrix and the positive lead portion of the insert to form a replica;
(d) removing securing means holding said insert to the matrix;
(e) securing a separation tool to the attaching means and
(f) applying a separation force to the separation tool to urge the replica away from the matrix, whereby the positive lead portion of the insert in combination with the tool applied provides the separation force at the center portion of the replica to assist in the separation of the replica from the surface of the matrix.

2. The method according to claim 1 wherein the positive lead portion of the insert is a spherical-shaped section.

3. The method according to claim 1 wherein the outer diameter of the insert is from about ¾ of an inch (1.95 centimeters) to about 1 inch (2.54 centimeters).

4. The method according to claim 1 wherein the replica is separated from the matrix by clamping the outer diameter of the matrix in a fixed position and thereafter applying a separating force to the insert to urge the replica away from the surface of the matrix.

5. The method according to claim 1 wherein the replica is thereafter used as a matrix.

6. The method according to claim 5 wherein the portion of the replica corresponding to the lead portion of the insert is used as a centering guide in a subsequent matrixing step.

* * * * *